United States Patent [19]
Graybill

[11] 3,944,049
[45] Mar. 16, 1976

[54] CONVEYOR SYSTEM AND METHOD FOR ASSURING A CONTINUAL BACKLOG

[76] Inventor: Wilbur H. Graybill, R.D. No. 2, Lititz, Pa. 17543

[22] Filed: Jan. 6, 1975

[21] Appl. No.: 538,947

Related U.S. Application Data
[63] Continuation of Ser. No. 383,711, July 30, 1923.

[52] U.S. Cl. .................. 198/34; 198/37; 198/40; 250/223 R; 198/76
[51] Int. Cl.² .......................................... B65G 47/26
[58] Field of Search ............ 198/37, 40, 34, 21, 76, 198/162, 164, 165; 250/223 R, 223 B

[56] References Cited
UNITED STATES PATENTS

| | | |
|---|---|---|
| 2,966,253 | 12/1960 | Gerrans ................................ 198/37 |
| 3,190,434 | 6/1965 | Dardaine .......................... 198/76 X |
| 3,465,869 | 9/1969 | Benatar................................ 198/40 |
| 3,817,368 | 6/1974 | Wentz et al.......................... 198/21 |

*Primary Examiner*—Richard A. Schacher
*Assistant Examiner*—James M. Slattery
*Attorney, Agent, or Firm*—Woodcock, Washburn, Kurtz & Mackiewicz

[57] ABSTRACT

A conveyor system for conveying pies from an oven to a pie wrapping machine comprising a cooling conveyor, an accumulator conveyor and a retarder conveyor. Optical sensors extend along the sides of the accumulator conveyor to determine the backlog. The output of the sensors are utilized to vary the rate of speed of the cooling conveyor to assure a proper backlog on the accumulator conveyor.

13 Claims, 6 Drawing Figures

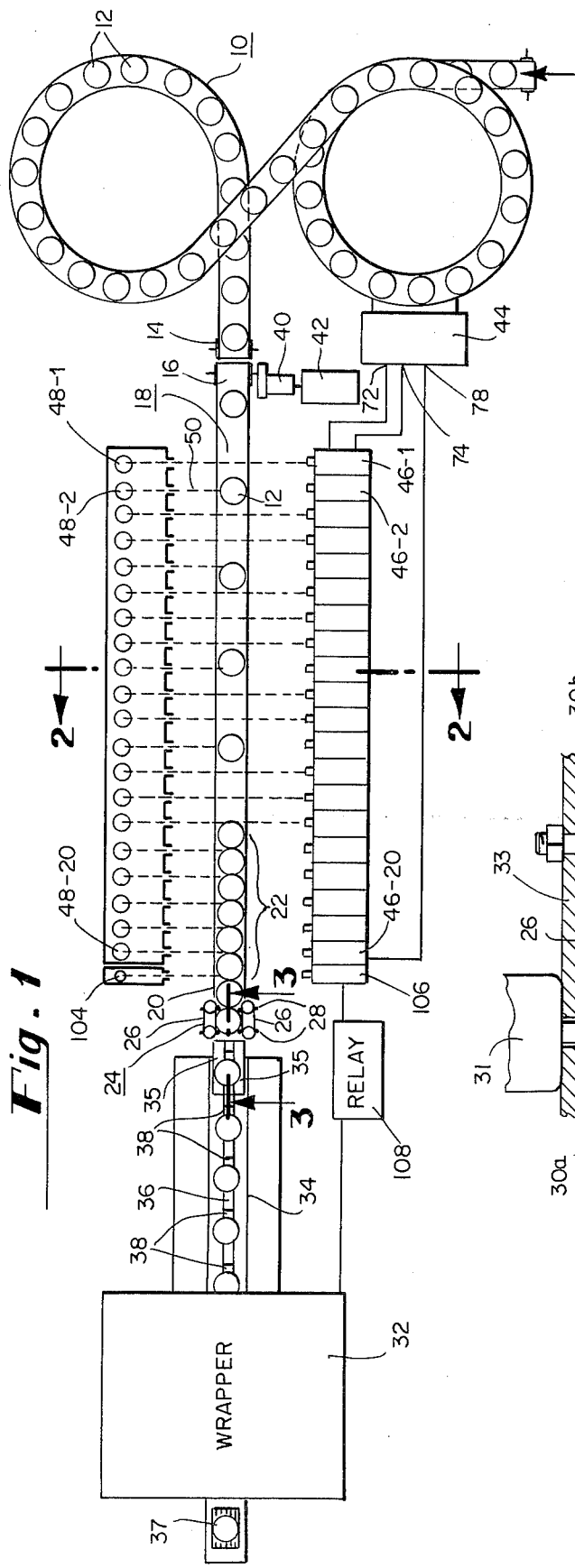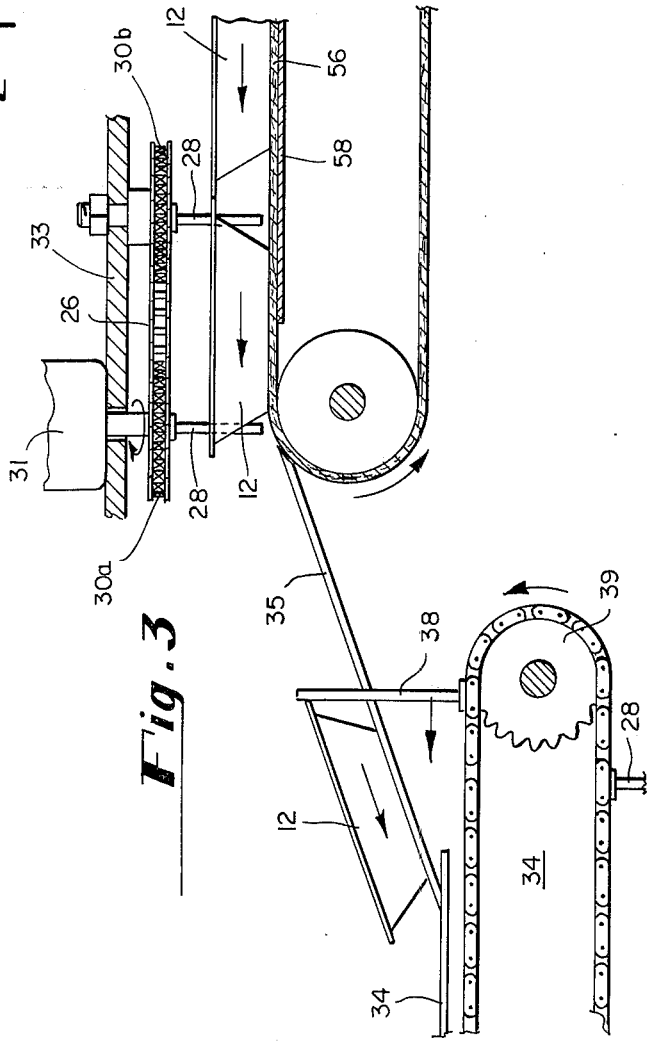

CONVEYOR SYSTEM AND METHOD FOR ASSURING A CONTINUAL BACKLOG

This is a continuation of Ser. No. 383,711, filed July 30, 1973.

BACKGROUND OF THE INVENTION

This invention relates to systems for conveying items so as to assure an adequate backlog at the output thereof.

Conveying systems of this type find particular utility in the field of packaging. In many instances, it is necessary to provide a backlog of items to a packaging apparatus to assure the proper operation of that apparatus. In the baking industry, pies and cakes and the like are conveyed from an oven to a baked goods wrapping machine which must be supplied with baked goods at a proper and continuous rate to maximize efficiency in wrapping as well as preventing jamming due to the absence of baked goods to be wrapped. For example, an FMC model 1301 wrapping machine wraps baked goods admirably so long as the baked goods are supplied to the input of the wrapping machine at a constant rate. However, in the absence of baked goods, the machine will jam resulting in a considerable down-time of the baked goods line.

In order to assure a proper supply to wrapping machines of this type, the wrapping machines have been supplied manually. This is an extremely costly way to assure an adequate supply to the wrapping. Moreover, it is very tedious work for the person or persons who are required to stand for hours on end, satisfying the demand of the wrapping machine.

The packaging of baked goods is but one example of situations wherein a constant supply must be provided at the output of the conveyor system. Filling lines for bottles and/or cans involve similar requirements. Manufacturing processes such as that disclosed in U.S. Pat. No. 2,916,792 — Crook et al also have similar requirements.

The Crook et al patent discloses a method and apparatus for extruding soap and conveying that soap so as to provide an adequate backlog for a press. To achieve this backlog, the soap extruder is driven at a variable speed in response to the backlog accumulated from a constant highspeed conveyor coupled to the output of the extruder. The backlog is created by providing a stop at the end of the accumulator conveyor which actually halts the advancement of the bars of soap on the accumulator conveyor. Electrodes positioned above and below the accumulator conveyor senses the change dielectric constants provided by the accumulating bars of soap. This change in capacitance which forms part of a capacitance bridge is then utilized to control a servo motor which in turn controls the motor driving the soap extruder.

The Crook et al system, while perhaps adequately satisfying the demand of the soap press, is in general too slow to satisfy the needs of a high-speed packaging line. The stop at the end of the accumulator conveyor which interrupts the advancement of the bars of soap on the accumulator conveyor so as to create a backlog, renders the Crook et al system too slow for use in high-speed packaging lines for two reasons. First, the stop which at least momentarily terminates the advancement of the items being conveyed renders the conveyence slow. Perhaps more importantly, the actual stopping of the items being conveyed requires that the accumulator conveyor operate at relatively slow speeds so as to avoid potentially harmful banging between the items as they accumulate behind the stop. The slower the accumulator conveyor runs, the more difficult it is to maintain a backlog at the stop and this in turn requires that the packaging machine in a highspeed packaging line operate at a slower rate so that the demand of the packaging machine does not exceed the backlog on the accumulator conveyor.

The Crook et al system is also poorly suited for high-speed packaging lines since it relies upon the sensing of the dielectric presented by the items being conveyed along the accumulator conveyor through the use of RF energy. Such a system cannot of course accommodate baked goods in foil plates since the foil plates will short out the RF energy. In addition, the servo motor control which is responsive to the dielectric constant represented by the items on the accumulator conveyor is somewhat slow due to the inertia of the servo motor so as to cause time-lags between backlog changes and speed signal changes to the speed controller of the soap extruder. This means that the Crook et al system is slow to react to changes in the backlog which could be critical in high-speed packaging lines. Also, the Crook et al system of control is prone to overshoot and oscillation in response to any change in the backlog on the accumulator belt. It is therefore somewhat unstable.

SUMMARY OF THE INVENTION

It is an object of this invention to provide a conveyor system and method which assures an adequate backlog of conveyed items regardless of the demand for the items.

In accordance with this object, a supply conveyor conveys items in spaced relation thereon to an accumulator conveyor operating at a substantially faster rate than the supply conveyor. A retarder conveyor communicates with the end of the accumulator conveyor. The retarder conveyor is driven at a somewhat slower rate than the accumulator conveyor so as to accumulate a backlog on the accumulating conveyor. In order to assure a sufficient backlog on the accumulating conveyor, sensor means are associated therewith to determine the number of mutually abutting and mutually spaced conveyed items thereon. The output from the sensor means is then applied to a variable speed drive means for the supply conveyor to increase the supply conveyor rate when the backlog on the accumulator drops and decrease the supply conveyor rate when the backlog on the accumulator conveyor increases.

In order to satisfy the demand at the output of the retarder conveyor, the retarder conveyor does not stop the accumulating backlog of conveyed items at the output end of the accumulator conveyor but merely slows that backlog. This permits the accumulating conveyor to operate at high speed without potentially damaging collisions between conveyed items as the spaced conveyed items on the accumulator conveyor reach the backlog of conveyed items at the output end thereof.

It is another object of this invention to sense the presence of conveyed items quickly and reliably.

In accordance with this object, the sensors associated with the accumulator conveyor comprise optical sensors extending along the path of conveyance. Sensors are substantially uniformly spaced so that the total number of items sensed by all of the optical sensors represent the number of conveyed items on the accumulator conveyor.

In a particularly preferred embodiment of the invention, the retarder conveyor comprises a pair of continuously driven endless conveyor members engaging opposite sides of each of the conveyed items at the output end of the accumulator conveyor. These endless conveyor members include downwardly extending lugs in spaced positions thereon so as to engage each of the conveyed items between a pair of lugs on each of the conveyor members at the output end of the accumulator conveyor.

In the particularly preferred embodiment of the invention, the optical sensors extending along the accumulator conveyor means have a spacing substantially equal to the maximum longitudinal dimension of the conveyed items in the direction of conveyance along the conveyor. By providing this spacing, a count of conveyed items on the accumulator conveyor is in effect provided even though the conveyed items are moving at a high speed. This count as provided by the optical sensors is then utilized as an input to the variable speed control for the supply conveyor.

It is another object of this invention to provide a failsafe feature for interrupting the operation of the apparatus coupled to the output of the retarder conveyor.

In accordance with this object, an additional optical sensor is provided along the accumulator conveyor to determine when the backlog drops below a predetermined number by sensing a space between the conveyed items.

It is another object of this invention to utilize the count output of the optical sensors in an SCR motor control circuit which provides a variable speed drive from the supply conveyor.

BRIEF DESCRIPTION OF THE DRAWINGS

FIG. 1 is a partially schematic top plan view of a preferred embodiment of the invention;

FIG. 2 is a view of the system shown in FIG. 1 taken along line 2—2;

FIG. 3 is a view of the system shown in FIG. 1 taken along line 3—3;

DETAILED DESCRIPTION OF A PREFERRED EMBODIMENT

Figure 4:
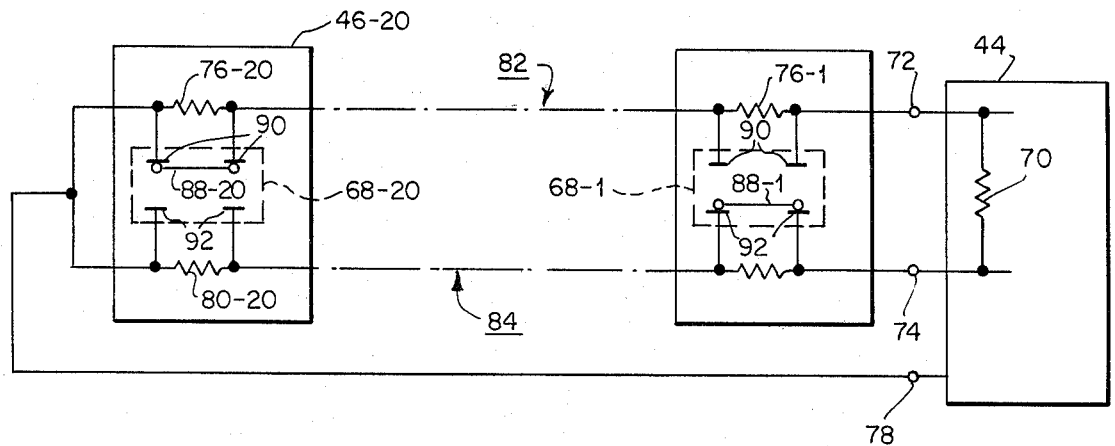
FIG. 4 is an electrical schematic of a portion of the control circuit in the system of FIG. 1.

Referring to FIG. 1, a supply conveyor 10 having an input end connected to an oven not shown in adapted to convey items 12 along the length thereof. As shown, the items 12 comprise pies which are maintained in spaced relation along the length of the conveyor 10 during cooling. Only a portion of the cooling conveyor 10 has been shown, and it therefore will be understood that such a conveyor has a considerable length capable of handling as many as eight thousand or more pies 12.

When the pies 12 reach the output end 14 of the cooling conveyor 10, they are transferred to the input end 16 of an accumulator conveyor 18. The pies 12 are conveyed along the accumulator conveyor 18 to the output end 20 where a backlog 22 of mutually abutting pies 12 is accumulated. In order to assure a backlog 22, the accumulator conveyor 18 travels at a substantially constant rate or speed equal to one-and a-half to twice the speed of the cooling conveyor 10. Such a differential between the speeds or rates of the cooling conveyor 10 and the accumulator conveyor 18 allows the pies 12 to be advanced quickly toward the output end 20 of the accumulator conveyor thus assuring the backlog 22.

In accordance with one very important aspect of the invention, the pies 12 are not stopped at the output end 20 of the accumulator conveyor 18 but merely retarded while permitting a continual flow from the end 20 to a retarding conveyor 24.

As shown in somewhat more elaborate detail in FIG. 3, the retarder conveyor 24 comprises a pair of conveyor chains 26, only one of which is shown in FIG. 3, carrying downwardly extending lugs 28 which are adapted to engage the front and rear of a pie 12. Since the chains 26 carrying the lugs 28 move continuously, the flow of pies 12 through the retarder 24 is continuous. This permits the pies 12 to be advanced at a more rapid rate on the accumulator conveyor 18 without any detrimental collisions or banging as the pies 12 approach the backlog 22. As shown in FIGS. 1 and 3, the chains 26 are mounted on and driven by sprockets 30a and 30b. The sprocket 30a is driven by and synchronized with a pie wrapping machine 32 shown in FIG. 1 by means of a gear box 31. The sprocket 30b is suitably mounted on a support 33 as an idler.

After leaving the retarder conveyor 24, the pies slide down spaced, inclined surfaces 35 to a wrapper conveyor 34 having an opening 36 with lugs 38 extending upwardly between surfaces 35 and engaging the pies 12 before they enter the wrapping machine 32. The wrapping machine 32 which may comprise an FMC model 1301 applies a wrapper to the pies to form a package 37 as shown at the output thereof. The lugs 38 are carried by a chain 37 mounted on sprockets 39 (only one of which is shown) and driven off of and/or in synchronism with the wrapper 32.

As shown in FIG. 1, the accumulator conveyor 18 is driven by a motor 40 in response to a motor speed control 42. In accordance with this invention, a motor speed control 42 maintains the speed of the motor 40 and thus the conveying rate of accumulator belt 18 substantially constant. However, the speed of the cooling conveyor 10 is varied inversely in response to the backlog 22 by means of a speed control 44 and an optical backlog sensing system which will now be described in detail.

A plurality of optical sensors/relays 46 (1–20) extend along a substantial portion of the accumulator conveyor 18 at one side thereof. A series of lamps 48 are juxtaposed to the sensors 46 in order to provide a count of the pies 12 on the accumulator conveyor 18, i.e., the pies in mutually abutting and mutually spaced relation. The lamps 48 and the optical sensors 46 are spaced a distance substantially equal to the longitudinal dimension of a pie 12 along the path of conveyance on the accumulator 18. The interruption of a beam of a light 50 between the lamps 48 and the corresponding sensors 46 represents one pie 12 which will in effect provide a count of the pies on the accumulator 18. By counting the pies 12 in this manner, the accumulating conveyor 18 provides the algebraic sum of the pies 12(+) entering the accumulator conveyor 18 from the cooling conveyor 10 and the pies 12(−) leaving the accumulator conveyor 18 at the output end 20 thereof even though the pies 12 are moving rapidly along the accumulator conveyor 18.

As perhaps best shown in FIG. 2, the beam 50 is created by light rays from the lamps 48 shining through a small aperture 52 in the housing 54. The aperture 52 is appropriately located in the housing 54 so as to create a beam which falls upon a relatively small area of the pies 12 near the top thereof as the pie travels along a conveyor belt 56 on a support 58 of the accumulator conveyor 18. If a pie 12 is in line with the beam 50, the beam 50 would be interrupted so that it will not reach an aperture 60 in a housing 62 containing a photosensor 66. As shown in FIG. 2, the photosensor 66 is mounted on a support member 64.

Each of the light sensors/relays 46 (1–20) includes one photosensor 64 and a relay 68 associated therewith as will now be described with reference to FIG. 4. A first relatively large resistor 70 (500Ω) is connected between input terminals 72 and 74 leading into the motor speed control 44 shown in FIG. 1. A first series 82 of relatively small resistors 76 (1–20) (25 Ω each) are connected to a terminal 72 where each of the resistors 76 is associated with one of the relays 68 (1–20). The last of the resistors 76 (20) in the first series is connected with a terminal 78. Another series 84 of small resistors 80 (1–20) are connected to the terminal 74 and extend to the terminal 78.

Each relay 68 of each sensor/relay 46 is able to short out the resistor 76 or the resistor 80 depending upon the position of the contact bar 88 with respect to stationary contacts 80 and 92. As shown in FIG. 4, the relay 68-1 of the sensor/relay 46-1, due to the absence of a pie 12 to be sensed by the photosensor 46-1, is in a position so as to short out the resistor 80-1 in the line 82 and place the resistor 76-1 in series with the other resistors 76. On the other hand, the sensor/relay 46-20 at the other end of the accumulator conveyor 18 senses the backlog 22 so as to be in a position to short out the resistor 76-20 while placing the resistor 80-1 in series with the other resistors 80.

Figure 5:
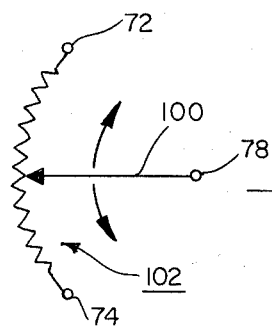
FIG. 5 is an electrical schematic of a potentiometer which may be replaced by the circuit of FIG. 4 and an SCR motor control circuit.

The arrangement shown in FIG. 4 operates like a potentiometer 102 as shown in FIG. 5 where the terminal 78 is connected to a wiper arm 100 for a potentiometer 102 and the resistance of the potentiometer is connected between terminals 72 and 74. In the arrangements of FIGS. 4 and 5, the total impedance between the terminal 78 and the terminal 72 plus the total impedance between terminal 78 and the terminal 74 is always 500 ohms no matter what position the relays 68 are in. In this sense, the circuit of FIG. 4 is equivalent to the potentiometer of FIG. 5. If the resistor 70 were eliminated as may be desirable in some cases, the circuit of FIG. 4 would be strictly equivalent to the potentiometer of FIG. 5.

Figure 6:
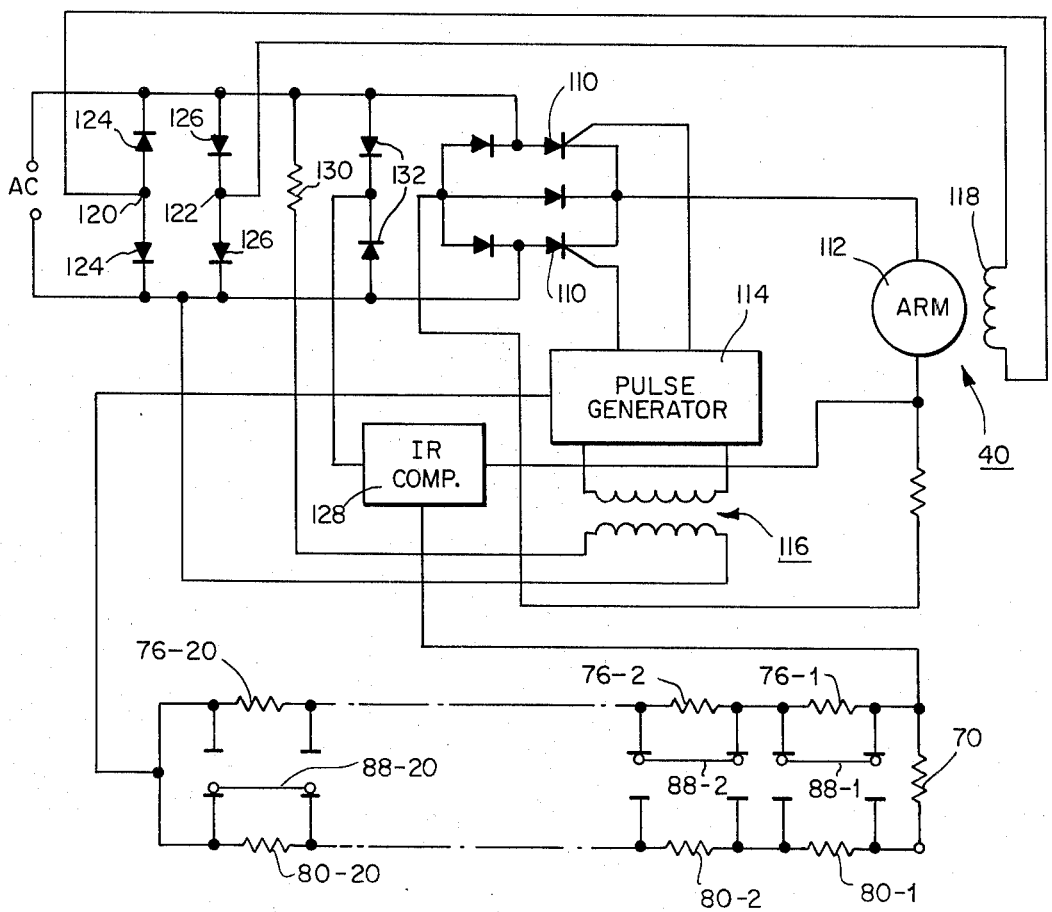
FIG. 6 is a schematic diagram of an SCR motor control circuit.

Because of this equivalency, the circuit of FIG. 5 may be utilized to replace a potentiometer in an SCR motor control circuit 44 as shown in FIG. 6 to control the speed of the cooling conveyor 10.

A full wave SCR (silicon-controlled rectifier) motor control circuit is shown in FIG. 6 comprising parallel connected SCR's 110 which are coupled to an AC power supply. The application of power to the armature 112 of the motor 40 in response to the firing of the SCR's 110 is controlled by firing pulses from a pulse generator 114 which is coupled to the AC power supply through transformer 116 to assure the proper timed relationship between the firing pulses and the AC power signal. The field coil 118 of the motor 40 is connected between the junctions 120 and 122 of rectifiers 124 and 126 respectively.

In order to adjust the speed of the motor 40, it is necessary to adjust the timing of the firing pulses with respect to the AC power signal and this is accomplished by adjusting the voltage at the terminal 78 as a result of the switching in and out of resistors 76-1 through 80-20 and resistors 80-1 through 80-20 in response to the snesors 46. Since one resistor is shorted out of the series 76 while a resistor of the same size is placed in the series 80 or vice versa as the contact 88 moves from one position to another, the total resistance between the terminals 72 and 74 remains constant. This permits the IR compensation feedback circuitry 128 combination with a resistor 130 in series with the armature 112 to control the acceleration of the motor 40 independently of changes in the voltage applied to the pulses generator 114 as a function of the position of the switches 46-1 through 46-20. The DC power source for the IR compensation feedback circuit 128 comprises the rectifiers 130 connected across the AC supply 112.

Although the circuit in FIG. 6 has been shown in simplified form, the details of such a circuit are well known in the art. For example, Pacific Industrial Controls, a division of Teledyne, Inc. sells an E300, E500 full wave SCR motor speed control substantially identical to that shown in FIG. 6 including the IR compensation feedback circuit 128 and the firing pulse generator 114.

Even with the motor speed control 44 for the cooling conveyor 10, it is possible to deplete the backlog 22 on the accumulating conveyor 18. If the backlog is depleted, the positon of the pies 12 at the output end 20 of the conveyor 18 may get out of sync with the lugs 28 of the retarder 24. This can result in the lugs 28 crushing the pies 12.

In order to prevent such a crushing of pies 12, an additional lamp 104 and sensor 106 are provided. If the beam which crosses between the lamp 104 and the sensor 106 fails to strike a pie 12, the sensor generates a signal which is applied to a relay 108 to indicate that there is no backlog for the retarder 24. In other words, a pie 12 advancing down the accumulator conveyor 18 might very well find itself between two lugs 28 since there is no pie 12 ready for feeding into the retarder 24 which could prevent the rapidly advancing pie 12 from entering the retarder 24. The relay 108 then interrupts the power to the wrapper 34 to terminate the advance of the pies 12 by lugs 38 as well as abruptly halting the movement of the lugs 28 on the retarder 34.

It will therefore be understood that the backlog of pies 12 on the accumulator 18 is now controlled at the input end 16 by the motor speed control 44 of the cooling conveyor 10 and the output end 20 by the relay 108 which is connected to the power supply for the wrapper 34. In effect, the relay 108 provides a failsafe measure in the event that the cooling conveyor 10 is not able to supply the pies necessary to maintain a sufficient backlog.

Certain details of the system shown and described have been omitted due to their status in the art and/or commercial availability. For example, photosensors 66 may comprise RCA CA3062 units having outputs coupled to resistor-relay combinations such as those produced by Potter & Brumfield, Model No. KHP17D11.

Although the conveyor system has been described in terms of a pie conveying apparatus, it will be understood that the invention is equally applicable to other conveying systems wherein it is desirable to maintain some sort of backlog. Conveying systems for bottling and canning beverage and beer are well adapted for use with the invention. Other types of systems might also utilize the invention.

Although a specific embodiment of the invention has been shown and described, it will be understood that various modifications may be made without departing from the true spirit and scope of the invention as set forth in the appended claims.

What is claimed:

1. A method of handling articles comprising the following steps:

conveying articles at a predetermined and substantially constant rate;

collecting a backlog of abutting conveyed articles;

depleting the backlog by removing articles therefrom at a rate substantially less than said constant rate;

simultaneously and individually sensing each of said conveyed articles including articles in said backlog; and supplying articles to be conveyed at a variable rate inversely related to the number of sensed articles in said backlog.

2. The method of claim 1 comprising the additional step of supporting said articles on a conveyor while conveying said articles so as to allow articles in said backlog on said conveyor to slip with respect to said conveyor while being sensed.

3. A conveyor system which assures an adequate and continuous supply of conveyed items at the output thereof comprising:

a supply conveyor means including a variable speed drive means for conveying said items at a variable rate;

an accumulator conveyor means having an input communicating with the output of said supply conveyor, said accumulator conveyor means including accumulator drive means for conveying said items at a faster rate than any said variable rate of said supply conveyor;

a retarder conveyor means including a retarder drive means having an input communicating with the output of said accumulator conveyor means, the speed of said retarder conveyor means being less than the speed of said accumulator conveyor means so as to permit a backlog of mutually abutting items to accumulate at said accumulator conveyor output without stopping said items at said accumulator conveyor output;

a sensor means associated with said accumulator conveyor means for sensing the backlog of said accumulator conveyor means said sensor means comprising a series of uniformly spaced optical sensors extending along said accumulator conveyor means, said optical sensors having a maximum spacing substantially equal to the maximum dimension of said conveyed items in the direction of advance along said accumulator conveyor means so as to provide a signal representing a count of mutually abutting and mutually spaced conveyed items on said accumulator conveyor means regardless of the position of said items on said conveyor means relative to said optical sensors; and a variable speed control means having an input coupled to said sensor means and an output coupled to said variable speed drive means so as to control the speed of said supply conveyor means and the advancement of said conveyed items to said accumulator conveyor means in response to said signal representing said count so as to assure an adequate backlog at said accumulator conveyor output.

4. The system of claim 3 wherein said sensor means further comprises a series of relays associated with said series of optical sensors, said variable speed control means including resistors connected and disconnected by said relays so as to change the speed of said variable speed drive in response to the number of conveyed items on said accumulator conveyor.

5. The system of claim 3 wherein said retarder conveyor means comprises a pair of continually driven endless conveyor members engaging opposite sides of each of said conveyed items at said output end of said accumulator conveyor means.

6. The system of claim 5 wherein said pair of conveyor means includes downwardly extending lugs at spaced positions on said conveyor means so as to engage said conveyed items between a pair of lugs on each of said conveyor members at said output end of said accumulator conveyor means.

7. The system of claim 6 wherein said retarder conveyor means further comprises a pair of inclined slide members extending from said pair of conveyor members.

8. The system of claim 3 including additional sensor means associated with said accumulator conveyor means for sensing the absence of a backlog immediately adjacent the retarder conveyor means and relay means associated with said additional sensor means for interrupting advancement of said retarder conveyor means.

9. The system of claim 8 wherein said additional sensor means comprises an optical sensor.

10. The conveying system of claim 3 wherein said variable speed control means comprises:

AC power supply means;

a silicon-controlled rectifier coupled to said power supply means and said variable speed drive means comprising a DC motor for applying DC power to said DC motor in response to the firing of said silicon-controlled rectifier;

a DC source;

a firing pulse control circuit coupled to said silicon-controlled rectifier for firing said rectifiers in timed relationship with the AC power generated by said power supply means, said pulse generating means comprising a pulse generator and variable resistance means controlling the timing of the pulses generated by said pulse generating means, said variable resistance means including:

a first series of resistors; and a second series of resistors having a total resistance equal to the total resistance of said first series of resistors;

said first series of resistors being connected in series with said second series of resistors across said DC source, the junction of said first series and said second series forming a control terminal connected to said pulse generator; and a plurality of switch means associated with said first series of resistors and said second series of resistors, each of said switch means capable of short-circuiting one resistor in one of said series so as to remove said one resistor from said one series while simultaneously placing another resistor in the other of said series in response to said sensor means so as to vary the voltage at said control terminal without varying the effective resistance in said first series and said second series across said DC signal source.

11. The system of claim 10 wherein said sensor means comprises a series of optical sensors extending along said accumulator conveyor means, said optical sensors having a spacing substantially equal to the maximum dimension of said conveyed items in the direction of advance along said accumulator conveyor means, said plurality of switch means being connected and responsive to said series of optical sensors.

12. The system of claim 3 further comprising a series of light sources extending along said accumulator conveyor means on one side thereof, said optical sensors being located on the other side of said accumulator conveyor means and aligned with said light sources such that items on said accumulator conveyor means will interrupt light beams directed across said accumulator conveyor means from said light sources to said optical sensors the width of said light beams as measured in the direction of advance along said accumulator means being substantially less than said maximum dimension of said conveyed items.

13. A conveyor system which assures an adequate and continuous supply of conveyed items at the output thereof comrpising:
   a supply conveyor means including a variable speed drive means for conveying said items at a variable rate;
   an accumulator conveyor means having an input communicating with the output of said supply conveyor, said accumulator conveyor means including accumulator drive means for conveying said items at a faster rate than any said variable rate of said supply conveyor;
   a retarder conveyor means including a retarder drive means having an input communicating with the output of said accumulator conveyor means, the speed of said retarder conveyor means being less than the speed of said accumulator conveyor means so as to permit a backlog of mutually abutting items to accumulate at said accumulator conveyor output without stopping said items at said accumulator conveyor output;
   a sensor means associated with said accumulator conveyor means for sensing the backlog of said accumulator conveyor means said sensor means comprising a series of uniformly spaced sensors extending along said accumulator conveyor means, said sensors having a maximum spacing substantially equal to the maximum dimension of said conveyed items in the direction of advance along said accumulator conveyor means so as to provide a signal representing a count of mutually abutting and mutually spaced conveyed items on said accumulator conveyor means regardless of the position of said items on said conveyor means relative to said sensors, said sensors having a sensing area measured in the direction of advance along said accumulator conveyor means substantially less than the maximum dimension of said conveyed items in the direction of advance along said accumulator conveyor means; and
   a variable speed control means having an input coupled to said sensor means and an output coupled to said variable speed drive means so as to control the speed of said supply conveyor means and the advancement of said conveyed items to said accumulator conveyor means in response to said signal representing said count so as to assure an adequate backlog at said accumulator conveyor output.

* * * * *